United States Patent Office 3,131,187
Patented Apr. 28, 1964

3,131,187
CERTAIN 2-GUANIDINO-4-ARYL-QUINAZOLINES
Adrian Marxer, Muttenz, Switzerland, assignor to Ciba Corporation, New York, N.Y., a corporation of Delaware
No Drawing. Filed May 16, 1962, Ser. No. 195,315
Claims priority, application Switzerland June 1, 1961
9 Claims. (Cl. 260—256.4)

The present invention relates to new guanidines. More especially it concerns 2-guanidino-4-arylquinazolines and their salts.

The aryl radical in position 4 is preferably a mononuclear or binuclear aryl, for example, a naphthyl or preferably phenyl radical.

The carbocycle of the quinazoline nucleus and the aryl radical in position 4 may be substituted. More especially, they may contain alkyl radicals, for example lower alkyl radicals, such as methyl, ethyl, propyl or isopropyl, straight or branched butyl, pentyl or hexyl radicals linked in any desired position, alkoxy such as lower alkoxy, for example methoxy, ethoxy, propoxy, butoxy or pentyloxy groups, halogen atoms such as chlorine or bromine, or the pseudohalogen trifluoromethyl.

The invention provides more especially compounds of the formula

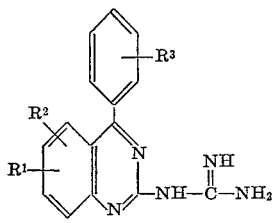

in which $R^1$, $R^2$ and $R^3$ may be identical or different and represent hydrogen, lower alkyl, lower alkoxy, halogen or trifluoromethyl—and their salts.

The new compounds are distinguished by their inhibitive effect on bacteria, fungi and vermiculae and by an amoebicidal effect and are suitable for treating diseases caused by bacteria or parasites. More especially, the new compounds are capable of segregating the larvae of filariae in the blood circulation of infected animals and they can therefore be used pharmacologically or as medicaments, for example for treating filariasis in humans and animals. In addition the new compounds display anti-inflammatory effects. They may also be used as intermediates for the preparation of medicaments.

Of special value are compounds of the formula

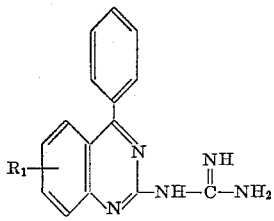

in which $R^1$ represents hydrogen, lower alkoxy or halogen—and their salts, and more especially 2-guanidino-4-phenylquinazoline.

The new compounds are obtained by known methods. Preferably an ortho-aminophenyl-aryl ketone, if desired in the form of a salt thereof, is reacted with dicyandiamide. The reaction is carried out in known manner, for example in the presence of a diluent and/or solvent, such, for example, as dimethylformamide, water or an alcohol such as butanol, or preferably in the melt in the absence of solvents or diluents. The reaction is preferably performed at an elevated temperature, for example at the boiling temperature of the solvent or diluent, under atmospheric or superatmospheric pressure, if desired in the presence of an inert gas such as nitrogen and, if desired, in the presence of a condensing agent such as a heavy metal salt, for example a copper salt.

The starting materials are known or can be made in known manner.

For the above process such derivatives of the starting materials may be used as are converted into the said starting materials under the reaction conditions.

Depending on the reaction conditions used the new compounds are obtained in the form of the free bases or of their salts. Salts of the new compounds are, for example, those of therapeutically useful acids, such as inorganic acids, for example hydrohalic acids such as hydrochloric or hydrobromic acid, perchloric, nitric or thiocyanic acid, sulfuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxy-benzoic, 2-acetoxybenzoic, methanesulfonic, ethane - sulfonic, hydroxyethanesulfonic, benzenesulfonic, para-toluenesulfonic or naphthalenesulfonic acid or sulfamylic acids, or methionine, tryptophan, lysine or arginine.

A resulting salt can be converted in the usual manner into the free base and a free base into a salt thereof, for example one of those mentioned above.

The salts of the new compounds may also be used for the purification of the resulting bases by converting the bases into the salts, separating the latter and then liberating the bases from the salts.

The invention further includes any variant of the present process in which an intermediate obtainable at any stage of the process is used as starting material and the remaining step or steps is/are carried out, or in which the process is terminated at any stage thereof, or in which a starting material is formed in the course of the reaction.

The new compounds can be used as medicaments, for example in the form of pharmaceutical preparations containing said compounds or salts thereof in admixture or conjunction with an organic or inorganic, solid or liquid pharmaceutical excipient suitable for enteral, parenteral or local administration. Suitable excipients are substances that do not react with the new compounds such, for example, as water, gelatine, lactose, starch, magnesium stearate, talc, vegetable oils, benzyl alcohols, gums, polyalkylene glycols white petroleum jelly, cholesterol or other known pharmaceutical excipients. The pharmaceutical preparations may be, for example, tablets, dragees, ointments or creams, or in liquid form solutions, suspensions or emulsions. They may be sterilized and/or may contain assistants such as preserving, stabilizing, wetting or emulsifying agents, salts for regulating the osmotic pressure, or buffers. They may also contain further therapeutically useful substances. The preparations are formulated by conventional methods. The new compounds may also be used as additives to animal fodder.

The quantity of excipient may vary within a wide range and chiefly depends on the form of administration.

The daily dosage depends on the form of administration and on the individual requirements of the patient. It may be easily determined by the physician.

The following examples illustrate the invention:

Example 1

17.82 grams of ortho-aminobenzophenone hydrochloride and 7.0 grams of dicyandiamide are melted at an internal temperature of 150 to 160° C. and the melt is maintained at this temperature for 2 hours. The hard substance is boiled with 3×200 cc. of water and each time the supernatant solution is decanted. The solution is kept overnight, clarified by filtration and treated with 50 cc. of 2 N-sodium hydroxide solution. The precipitating crystalline 2-guanidino-4-phenyl-quinazoline of the formula

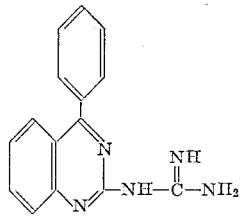

melts at 247 to 250° C. with decomposition.

A suspension of 17.4 grams of this base in 150 cc. of alcohol is treated with 25.4 cc. of 2.5 N-alcoholic hydrochloric acid, whereupon for a short time the whole dissolves which is rapidly followed by crystallization. The mono-hydrochloride formed is filtered off and washed with alcohol and water. It melts at 236 to 238° C.

Example 2

A solution of 23.2 grams of 2-amino-5-chloro-benzophenone in 100 cc. of alcohol is treated with 45 cc. of 2.5 N-alcoholic hydrochloric acid. The alcohol is evaporated under vacuum and the residue is intimately mixed with 9.24 grams of dicyandiamide. The mixture is melted at an internal temperature of 150 to 160° C. and maintained at this temperature for 2½ hours. The solid residue is boiled with 200 cc. of water and the insoluble constituent is purified by being heated with 150 cc. of alcohol and then once more filtered off. The residue is then introduced into 900 cc. of boiling water, mixed with 100 cc. of 2 N-hydrochloric acid and suctioned off and the insoluble constituent is once more treated in the same manner. The hydrochloric acid aqueous solutions are cooled, whereby a thick jelly forms which turns crystalline on addition of 200 cc. of alcohol and trituration.

The resulting 2-quanidino-4-phenyl-6-chloro-quinazoline hydrochloride of the formula

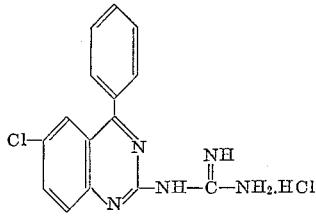

melts at 300–303° C.

When the alcoholic mother liquor is concentrated and the crystallizate treated with dilute hydrochloric acid as described above a further quantity of the product is obtained.

Other examples of the foregoing invention specifically include, as is evident from the above, compounds of the formula

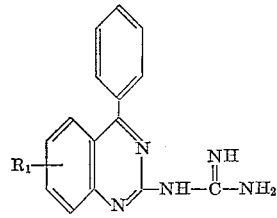

wherein $R_1$ is lower alkoxy, and therapeutically useful acid addition salts thereof, as well as compounds of the formula

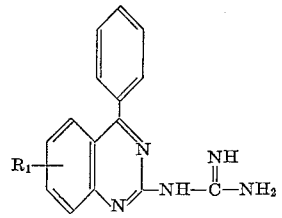

wherein $R_1$ is halogen, and therapeutically useful acid addition salts thereof. A typical compound of the latter type is 2-guanidino-4-phenyl-6-chloro-quinazoline.

What is claimed is:

1. A member selected from the group consisting of a compound of the formula

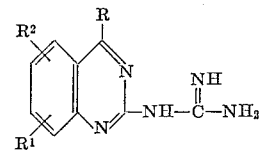

in which R stands for a member selected from the group consisting of phenyl, lower alkyl phenyl, lower alkoxy phenyl, halogen-phenyl, trifluoromethyl phenyl, naphthyl, lower alkyl naphthyl, lower alkoxy naphthyl, halogen-naphthyl and trifluoromethyl naphthyl and $R^1$ and $R^2$ each represents a member selected from the group consisting of hydrogen, lower alkyl, lower alkoxy, halogen and trifluoromethyl, and a therapeutically acceptable acid addition salt thereof.

2. A compound of the formula

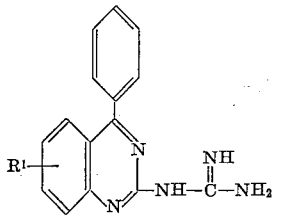

in which $R^1$ represents lower alkoxy.

3. A therapeutically acceptable acid addition salt of a compound claimed in claim 2.

4. A compound of the formula

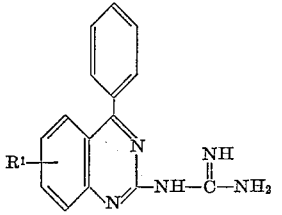

in which $R^1$ represents halogen.

5. A therapeutically acceptable acid addition salt of a compound claimed in claim 4.

6. 2-guanidino-4-phenyl-quinazoline.

7. A therapeutically acceptable acid addition salt of the compound claimed in claim 6.

8. 2-guanidino-4-phenyl-6-chloro-quinazoline.

9. A therapeutically acceptable acid addition salt of the compound claimed in claim 8.

References Cited in the file of this patent
FOREIGN PATENTS 59,541/60    Australia _____ Oct. 20, 1960

OTHER REFERENCES

Burger: Medicinal Chemistry (New York, 1960), page 39.

Theiling et al.: J. Am. Chem. Soc., vol. 74, pp. 1834–1836 (1952).